United States Patent [19]
Miller et al.

[11] Patent Number: 6,100,920
[45] Date of Patent: Aug. 8, 2000

[54] VIDEO SIGNAL COMPENSATOR FOR COMPENSATING DIFFERENTIAL PICTURE BRIGHTNESS OF AN OPTICAL IMAGE DUE TO UNEVEN ILLUMINATION AND METHOD

[75] Inventors: Frederick A. Miller, Santa Barbara; Abraham Kotlyar, Goleta; Frank D. D'Amelio, Santa Barbara; Paul Hartloff, Ventura; Erhan Gunday, Santa Barbara, all of Calif.

[73] Assignee: Circon Corporation, Santa Barbara, Calif.

[21] Appl. No.: 09/228,773

[22] Filed: Jan. 11, 1999

Related U.S. Application Data

[62] Division of application No. 08/791,637, Jan. 31, 1997, abandoned.

[51] Int. Cl.[7] .................................................... H04N 7/18
[52] U.S. Cl. ................................................. 348/68; 348/69
[58] Field of Search ................................. 348/65, 68, 69, 348/70, 72–76, 251, 490, 615; 600/104, 109; H04N 7/18

[56] References Cited

U.S. PATENT DOCUMENTS

| | | | |
|---|---|---|---|
| 3,654,385 | 4/1972 | Flagle | 178/5.4 |
| 4,803,550 | 2/1989 | Yabe et al. | 358/98 |
| 4,979,042 | 12/1990 | Vogel | 358/163 |
| 5,022,383 | 6/1991 | Sakiyama et al. | 128/6 |
| 5,047,847 | 9/1991 | Toda et al. | 358/98 |
| 5,157,497 | 10/1992 | Topper et al. | 358/209 |
| 5,269,289 | 12/1993 | Takehana et al. | 128/4 |
| 5,343,302 | 8/1994 | Yamahita | 348/251 |
| 5,475,420 | 12/1995 | Buchin | 348/72 |
| 5,627,583 | 5/1997 | Nakamura et al. | 348/72 |
| 5,631,695 | 5/1997 | Nakamura et al. | 348/65 |

OTHER PUBLICATIONS

Sony Standard Drawing No. 7-822-800-22, Schematic Drawing of Shading Circuit for Video Camera, Tentative Part No. CCR-1, one page.

*Primary Examiner*—Young Lee
*Attorney, Agent, or Firm*—Bradley M. Ganz

[57] ABSTRACT

A video signal compensator and method for compensating for differential picture brightness of an optical image due to uneven illumination is shown. The video signal compensator includes a device for generating a compensating signal substantially representing at least one parameter of a compensating waveform required to produce a video signal representing an optical image having a substantially uniform brightness. An adder operatively coupled to the compensating signal generating device and a video signal adds the compensating signal and the video signal to produce a compensating video signal used as an input to a video signal processor adjusting its gain both vertically and horizontally compensated by increasing the gain of the video signal representing that part of the optical image which is less bright than a reference and reducing the gain of the video signal representing that part of the optical image which is brighter than a reference compensating the video signal to represent an optical image having a substantially uniform brightness. The compensating signal can be generated by either an analog signal generating device or a digital signal processing device.

3 Claims, 6 Drawing Sheets

VIDEO SIGNAL COMPENSATOR FOR COMPENSATING DIFFERENTIAL PICTURE BRIGHTNESS OF AN OPTICAL IMAGE DUE TO UNEVEN ILLUMINATION AND METHOD

This application is a division of application Ser. No. 08/791,637, filed Jan. 31, 1997 abandoned.

BACKGROUND OF THE INVENTION

1. Field of the Invention

This invention relates to a video signal compensator for compensating a video signal for differential picture brightness of an optical image and more particularly relates to a video signal compensator for compensating a video signal for differential picture brightness of an optical image due to uneven illumination. In the preferred embodiment, the video signal compensator compensates for differential picture brightness of an optical image from an endoscope which is brighter at its center than at its periphery. The optical image from the endoscope is imaged onto a video sensor.

2. Description of the Prior Art

A wide variety of optical instruments are used to generate optical images. In the medical field, endoscopes are used in performing surgical procedures, such as minimally invasive surgery, to generate optical images from within a body cavity.

In the industrial field, borescopes are used to inspect interior spaces, such as the interior stage of a jet engine, which are generally inaccessible. Other optical instruments are used for performing such routine tasks as inspecting interiors of sewer lines, ventilation systems, pipe lines and other elongated cavities.

Typically, such optical instruments have a video camera operatively coupled to the proximal end thereof to receive the optical image and to produce an video signal of the optical image. The video signal is typically processed by a video signal processor and displayed on a video monitor or stored by a video storage device.

It is also known in the art that a video sensor may be integral with the proximal end of an optical instrument. The output of the video sensor in such an instrument is typically applied to a video signal processor which processes the video signal to produce a video output signal which is applied to a video monitor. One example of such an instrument is a Video Operating Laparoscope offered for sale and sold by CIRCON ACMI Division of Circon Corporation, the assignee of the present invention.

It is also well known in the art that body cavities, hidden or inaccessible spaces and elongated cavities are either dark or have such low light levels that it is difficult for optical instruments to produce an optical image that can be satisfactorily imaged by a video camera or video sensor.

In order to overcome these problems, a wide variety of light sources have been developed to produce light energy at light levels that provide sufficiently high light levels of illumination in the body cavities, hidden or inaccessible spaces and elongated cavities. A sufficiently high light level enables the optical instruments to produce an optical image of the operative site and to transmit the optical image to the proximal end of the optical instrument enabling the optical image to be imaged by the video camera or video sensor.

In order to accomplish the above, the optical instruments typically include a light guide, such as for example a fiber optic light guide, to transmit light energy from a light source through the proximal end of and through the instrument to the distal end thereof. The light energy is used to illuminate the operative site or area subject to inspection. The optical image is then transmitted by an optical image transferring system from the distal end of and through the instrument to the proximal end thereof where the optical image is directed on the video camera or video sensor.

It is also known in the art that the endoscope may have an illumination source located at the distal end of the endoscope. One of the known prior art laparoscopes had a light bulb located at the distal end of the laparoscope wherein electrical conductors extending from the distal end to the proximal end of the laparoscope energized the light bulb to illuminate the operative site or area subject to inspection. Illumination from the light bulb located at the distal end of the endoscope produced uneven illumination due to the characteristics of the light energy emanating from the light bulb.

It is also known in the art to locate a video sensor, such as a CCD chip, on the distal end of a optical instrument. Such a structure eliminates the use of a optical image transferring system or member. However, such optical instruments still require a light guide to transmit light energy from a light source to the distal end thereof to illuminate the operating site or area subject to inspection. Electrical conductors located within the optical instrument transmit the video signal from the distal tip of and through the instrument to a video signal compensator.

It has been observed that when an optical instrument is used in combination with a light guide, or distally located illumination source, the resulting optical image from the optical instrument has differential picture brightness due to uneven illumination at the distal end thereof.

For example, a typical medical endoscope, having a fiber optic light guide, have diameters generally in the order of about 5 mm to about 10 mm or larger at the distal end. Such endoscopes generally produce an optical image that is brighter in the center and dim on the periphery or edge. In smaller diameter endoscopes having a fiber optical light guide, for example endoscopes having a diameter at the distal end of less that 5 mm, the optical image may be saturated at the center.

One known design approach to solve the differential picture brightness problem is to modify the structure and characteristics of the light guide, the optical image transferring system or member or modify both in an attempt to obtain a more uniform brightness of the optical image developed by the optical instrument itself.

The fiber optic light guides and optics of the optical image transferring systems have been optimized, but, however, the differential picture brightness problem still persists.

The primary cause for the differential picture brightness problem has now been identified to be other than the optical instrument. It has now been identified that it is the light source itself which generates a light energy or light radiation having a peaked characteristic curve with a bright spot in the center thereof and a dim periphery or edge. When the light source is operatively coupled to the light guide, e.g. the fiber optic light guide in an endoscope, the transmitted light energy retains the characteristics of the light source; namely, a bright spot in the center thereof and a dim periphery or edge. In essence, each optical instrument reproduces the characteristic curve of the light source and this results in an optical image having a differential picture brightness due to uneven or non-uniform illumination.

Unsuccessful attempts have been made to design or modify the light source to reduce or eliminate the above described deficiencies.

In addition to the above and as is well known in the art, variations in the operating characteristics of the video sensor or video camera generating the video signals representing optical images introduce shading into the video signal. The combination of the light source problems and shading problems have resulted in poor quality optical images which, in turn, produce poor quality electronic optical images.

It is known in the prior art that vidicon tube cameras, such as for example, a Sony video tube cameras, have used a shading circuit to compensate for the variations in the operating characteristics of the vidicon tube itself (the "Sony Vidicon Shading Circuit"). The Sony Vidicon Shading Circuit used a parabolic waveform and a sawtooth waveform to generate a compensating signal which adjusts the video signal as required to overcome the variations of the vidicon tube operating characteristics.

U.S. Pat. No. 5,343,302 discloses a video camera which includes a correction circuit in which a parabolic wave signal is generated and the level thereof is adjusted in accordance with the zoom and iris settings of the camera's optical system. After adjustment, the parabolic wave signal is clipped in accordance with a reference level and the clipped parabolic wave signal is used for correcting the shading of the cameras image signal. The clipping of the parabolic correction signal allows for a more accurate shading correction. The shading correction on circuit performs the shading corrections principally in the case of the reduction of the light intensity ratio from the periphery to the center of the image caused by aperture eclipse and in the case of f-drop (i.e. reduction of the f-number) at the telephoto lens setting.

U.S. Pat. No. 5,157,497 discloses a method and apparatus for detecting and compensating for white shading errors in a digitized video signal using a flat white calibration target. The correction system is capable of automatically determining the amount of white shading correction to be applied to specific video image pixels as well as the application of that correction to a digitized video signal. The system includes an inspecting portion for identifying the required correction within a video frame, a calculating portion for computing the amount of correction to be applied to the video signal, and a correction portion for correcting the video signal based upon the correction computed by the calculating portion.

U.S. Pat. No. 5,053,879 discloses a method and device for shading correction used in a video printer comprising a TV camera for providing image data of a subject to be printed and an exposure CRT for displaying the image data thereon and to which photographic paper is exposed to make a video printout of the subject. In carrying out the shading correction method, the shading correction device employs a memory for storing the shading correction data, a frame memory for storing image date of a subject to be printed and a device for adding the shading correction data read out from the memory and the image data readout from the memory.

U.S. Pat. No. 4,979,042 disclose apparatus for correcting shading effects in video images for a document retrieval system. The document retrieval system captures an image of a document in electronic form using linear CCD imagers or a CCD array. The apparatus reduces the size of the memory required to store correction information by defining the two dimensional non-uniformity characteristics in terms of two functions that are orthogonal. The orthogonal correction functions are stored in separate memories. During a scan, a pixel counter addresses the X memory while a line counter addresses a Y memory. The correction factors thus obtained are applied sequentially to correct the pixel data value at the current X and Y coordinates. The sources of non-uniformity which are corrected by the apparatus include use of the lens having non-uniformities which are generally known in the optical art as the "cos" law (sometimes known as the cosine law) to focus the image onto the capturing device and, the CCD pixel sensitivity variations and spot uniformities that may occur in an illumination source such as a lamp filament.

The above described prior art represent the typical electronic correction devices and methods to correct shading in an optical image for a variety of video imaging apparatus and system.

SUMMARY OF THE INVENTION

A novel, new and unique compensating apparatus or video signal compensator for compensating differential picture brightness of an optical image due to uneven illumination is disclosed and taught by this invention. The compensating apparatus or video signal compensator includes a device for generating a compensating signal substantially representing at least one parameter of a compensating waveform required for the differential picture brightness of an optical image to produce a video signal representing an optical image having a substantially uniform brightness. An adder is operatively coupled to the compensating video signal generating device and a video signal for adding the compensating signal and the video signal to produce a compensating signal used as an input to a video signal processor adjusting its gain both vertically and horizontally by increasing the gain of the video signal representing that part of the optical image which is less bright than a reference and reducing the gain of the video signal representing that part of the optical image which is brighter than a reference. The compensated video signal represents an image having a substantially uniform brightness.

In addition, a new novel and unique method for compensating for differential picture brightness of an optical image due to uneven illumination is discloses and taught by this invention. The method comprises the steps of: (a) generating with a compensating signal device a compensating signal substantially representing at least one parameter of a compensating waveform required for the differential picture brightness of an optical image to produce a video signal representing an optical image having a substantially uniform brightness; and (b) adding with an adder operatively coupled to the compensating signal generating device and a video signal the compensating signal and the video signal to produce a compensating video signal used as an input to a video signal processor adjusting its gain both vertically and horizontally compensated by increasing the gain of the video signal representing that part of the optical image which is less bright than a reference and reducing the gain of the video signal representing that part of the optical image which is brighter than a reference compensating the video signal to represent an optical image having a substantially uniform brightness.

In the preferred embodiment of the apparatus and method of the present invention, the differential picture brightness of an optical image is brighter at its center than at its periphery or edges. Thus, the compensating video signal is used to adjust the gain of the video signal processor both vertically and horizontally by increasing the gain of the video signal in response to a sawtooth waveform representing the periphery or edges of the optical image and reducing the gain of the video signal in response to the parabolic waveform representing the center of the optical image compensating the video signal to represent an optical image having a substantially flat brightness.

In the Sony Vidicon Shading Circuit, the sawtooth wave generator and parabolic wave generator were used to generate a compensating signal to correct for the deficiencies introduced into or added into the video signal by the vidicon tube itself. The Sony Vidicon Shading Circuit was not used to correct for differential picture brightness of an optical image due to uneven illumination from an optical instrument imaged onto a vidicon tube or sensor.

The correction circuit of U.S. Pat. No. 5,343,302 generated a parabolic wave signal and the level thereof was adjusted in accordance with the zoom and iris settings of the camera's optical system. Further, the parabolic wave signal of the correction circuit of U.S. Pat. No. 5,343,302 was clipped to perform shading corrections principally in the case of the reduction of the light intensity ratio from the periphery to the center of the image caused by aperture eclipse and in the case of f-drop (i.e. reduction of the f-number) at the telephoto lens setting. The correction circuit of U.S. Pat. No. 5,343,302 was not used to correct for, nor does the correction circuit therein disclose, suggest or teach compensating for differential picture brightness of an optical image from an optical instrument imaged onto video camera or sensor.

The method and apparatus of U.S. Pat. No. 5,157,497 detects and compensates for white shading errors in a digitized video signal using a flat white calibration target. The method and apparatus of U.S. Pat. No. 5,157,497 was based on use of a flat white calibration target and was not used to correct for differential picture brightness of an optical image from an optical instrument imaged onto video camera or sensor.

The shading correction device disclosed in U.S. Pat. No. 5,053,879 is used for a video printer and employs a memory for storing the shading correction data, a frame memory for storing image date of a subject to be printed and a device for adding the shading correction data read out from the memory and the image data readout from the memory. The shading correction device of U.S. Pat. No. 5,053,879 is based on adding shading correction data read out from the memory with the image data readout from the memory. U.S. Pat. No. 5,053,879 does not disclose, teach or suggest correcting for differential picture brightness of an optical image having uneven illumination from an optical instrument imaged onto video camera or sensor.

The apparatus and method disclosed in U.S. Pat. No. 4,979,042 disclose and teach correction of shading effects in video images for a document retrieval system. The document retrieval system capture an image of a document in electronic form using linear CCD imagers or a CCD array. The apparatus defines the two dimensional non-uniformity characteristics in terms of two functions that are orthogonal about orthogonal axes. The sources of non-uniformity which are corrected by the apparatus compensate for lens deficiencies, the CCD pixel sensitivity variations and spot non-uniformities that may occur in an illumination source such as a lamp filament. The apparatus and method disclosed in U.S. Pat. No. 4,979,042 do not teach, disclose or suggest compensating differential picture brightness of an optical image due to uneven illumination from an endoscope imaged onto a video camera.

The prior art does not disclose, teach or suggest compensating video images for the non-uniform characteristics of a light source located at or transmitted by a light guide to the distal end of an optical instrument to illuminate an operative site or inspection area.

The apparatus and method of the present invention overcomes several of the problems of the prior art including compensating for differential picture brightness due primarily to the non-uniform characteristics of a light source located as or operatively coupled to a light guide for illumination of an operative site or inspection area. The light energy is typically reflected from the surface of the operative site or inspection area. The reflected light energy and optical image developed therefrom in an optical instrument include the non-uniformities or unevenness of the light energy.

One advantage of the present invention is that the compensation correction apparatus and method can be used for optical images developed form a variety of optical instruments including endoscopes having an optical imager imaged onto a video sensor or video camera.

Another advantage of the present invention is that the amount and shape required for compensation correction can be adjusted as required or an approximation thereof can be provided with adjustable wave shaping devices or circuits.

Another advantage of the present invention is that optical instruments developing an optical image having differential picture illumination with an uneven light return path and light and dark areas which are imaged onto a video sensor or video camera can have the so produced optical images compensated electronically such that the brightness of the areas is more uniform or flat.

Another advantage of the present invention is that a sampling circuit or sensing circuit may be used to determine the correction required for appropriate compensation or an approximation thereof and such circuits can be used with adjustable wave shaping devices or circuits.

Another advantage of the present invention is that a the light returned from the cosine angle of the reflecting surface can be sampled or sensed and a correction based thereon can be developed and applied to video amplifiers to reduce the gain in the bright areas and increase the gain in the dark areas to produce a video signal representing an optical image having substantially even field illumination.

Another advantage of the present invention is that the compensating signal required for making the corrections and the means for applying the compensating signal may be analog, digital or other means, e.g., a hybrid of analog and digital.

Another advantage of the present invention is that a video signal compensator can produce corrections wherein the differential picture brightness of an optical image is brighter at its center than at its periphery or edges. The video signal compensator includes an adder which adds a sawtooth waveform, a parabolic waveform and a video signal to produce a compensating signal used as an input to video signal processor adjusting a its gain both vertically and horizontally by increasing the gain of the video signal in response the sawtooth waveform representing the periphery of the optical image and reducing the gain of the video signal in response to the parabolic waveform representing the center of the optical image compensating the video signal to represent an optical image having a substantially flat brightness.

Another advantage of the present invention is that a video signal compensator can produce corrections wherein the differential picture brightness of an optical image is brighter at its periphery or edges than at its center. The video signal compensator includes an adder which adds a sawtooth waveform, a parabolic waveform and a video signal to produce a video compensating signal used as an input to a video signal processor adjusting its gain both vertically and horizontally by decreasing the gain of the video signal in response the sawtooth waveform representing the periphery of the optical image and increasing the gain of the video signal in response to the parabolic waveform representing the center of the optical image compensating the video signal to represent an optical image having a substantially flat brightness.

Another advantage of the present invention is that a video signal compensator can include a control device operatively coupled to an adder to increase the brightness of the output video signal to a level which is greater than the average of the differential brightness of the optical image due to the uneven illumination.

Another advantage of the present invention is that a video signal compensator can be used for compensating differential picture brightness of an optical image due to uneven illumination from an endoscope imaged onto a video sensor or video camera.

Another advantage of the present invention is that a method for compensating for differential picture brightness of an optical image due to uneven illumination using a video signal compensator is shown.

Another advantage of the present invention is that a method for compensating for an uneven light path in an endoscope or other optical instrument is shown. The method for compensating can be used to compensate for non-uniformities of the optical system alone or in combination with an illumination system having non-uniformities as used in television viewing systems.

BRIEF DESCRIPTION OF THE DRAWINGS

The foregoing and other advantages of this invention will be apparent from the following description of the preferred embodiment of the invention when considered with the illustrations and accompanying drawings which include the following Figures:

FIG. 13($a$) and FIG. 13($b$) are pictorial representations of: (i) an optical image wherein the center is brighter than a reference level and the periphery is less bright than a reference level and of an optical image wherein the center is less bright than a reference level; and (ii) the periphery is brighter than a reference level, respectively;

DESCRIPTION OF THE PREFERRED EMBODIMENT

Figure 1:
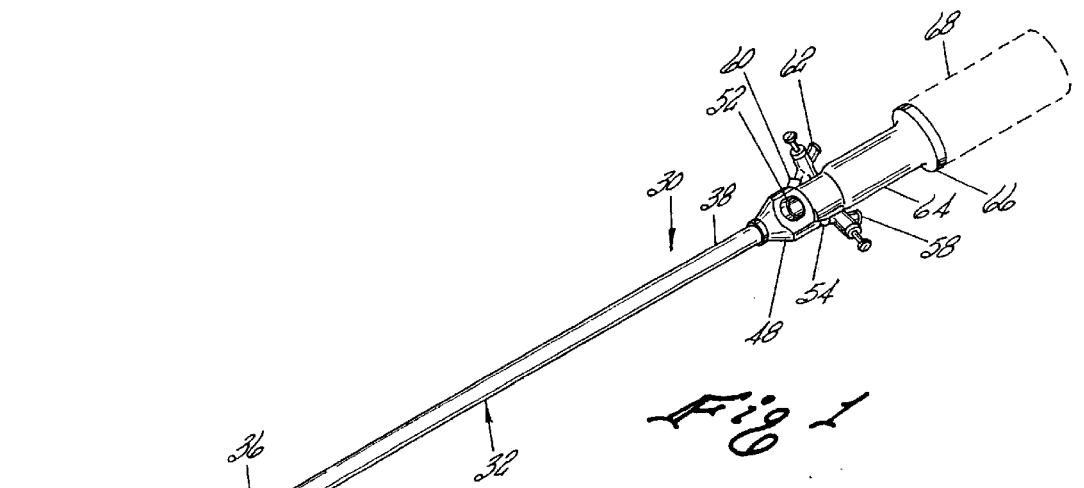
FIG. 1 is a front, top and left end perspective view of a endoscope in the form of a laparoscope having a video camera operatively coupled to an eyepiece located at the proximal end thereof for practicing this invention.

Before commencing with the detailed description of the preferred and other embodiments of the present invention, the following review will provide a better understanding of the application and utility of the present invention to optical instruments or optical devices which are used to produce an optical image directed onto or imaged onto a video sensor or camera.

Video cameras used with optical instruments for medical and industrial applications generally are known as an "analog video camera", a "digital video camera" or a "digitally controlled video camera".

In an analog video camera, the video sensor is typically separated from a video signal processor which is sometimes referred to as the video camera. The output of a CCD is an analog signal which is applied to a preamplifier. The output of the preamplifier is operatively connected to a remotely disposed video signal processor either directly by electrical conductors or indirectly by a wireless device such as infrared transmitter and receiver. The output of the video signal processor is an analog video signal in a preselected format, e.g., NTSC, Y/C, RGB or other Format. All signal transmission and processing is accomplished using analog techniques.

In a digital video camera, the video sensor is again typically separated from the video signal processor. The output of a CCD is an analog signal which is applied to a preamplifier. The output of the preamplifier is operatively connected by a analog-to-digital converter to a remotely disposed digital signal processor. The output of the digital signal processor is applied to a digital-to-analog converter wherein the output thereof is an analog video signal in a preselected format, e.g., NTSC, Y/C, RGB or other Format. It is also envisioned that the preselected format, encoding scheme or standard television system encoding format could be the PAL format, SECAM format or any other format utilized in a country as a standard of that country. In addition, the format could be a proprietary format for use in a closed circuit television system. The use of the term "NTSC, Y/C, RGB or other Format" is intended to all cover of such preselected formats of output video signals.

In a digitally controlled video camera, the video sensor preamplifier and remotely disposed video signal processor are substantially operationally the same as the analog video camera. However, a digital system controls the operation of each of the components and controls transfer of signals between components, all under control of a digitally programmed devices. However, the output of the video camera is an analog video signal in a preselected format, e.g., NTSC, Y/C, RGB or other Format.

The video signal compensator, apparatus and method of the present invention can be used with any of the above described video cameras. The term "video sensor" as used herein is intended to collectively and broadly refer to a video sensor, line sensor, solid state sensors, area sensors, CAD, vidicon tubes, CCD sensors or other video sensors used in practicing this invention including sensors located at the proximal end of the optical instrument, such as an endoscope. Also, the term "video sensor" is intended to cover all such sensors located at a different location in the optical instrument, such as at a CCD sensor located the distal tip of an endoscope, or to a video camera operatively attached to an optical instrument, endoscope or other optical device wherein an optical image developed by the optical instrument or optical device, having an illumination provided from a light source or a light guide, is imaged onto a CCD sensor or video camera.

Referring now to FIG. 1, FIG. 1 illustrates the preferred application for using the teachings of the present invention in an endoscope. FIG. 1 illustrates an instrument, generally as 30, which is an endoscope in the form of a laparoscope for medical surgery. The instrument 30 includes a rigid elongated sheath tube 32 having a selected length and a distal section or end 36 and a proximal section or end 38. The distal end 36 terminates in a distal tip shown generally as 44. The interior of the laparoscope includes an optical image transferring means, system or member, typically a lens system including relay lenses, for transferring an optical image from the distal tip 44 through the ridged elongated sheath tube 32 to the proximal end 38 of the laparoscope.

The proximal end 38 of the laparoscope is operatively connected to an extension member shown generally as 48. The extension member 48 includes means for supporting a light post 52 and means for defining openings or ports for two channels, which openings are shown as 54 and 60 (60 being visible in FIG. 2). Valve means, which in the preferred embodiment are trumpet valves 58 and 62, are operatively connected to openings 54 and 60 respectively. An eyepiece housing, shown generally as 64, terminates in an eyepiece 66 which permits a surgeon to view the optical image transferred through the laparoscope. However, in FIG. 1, a video sensor, typically a CCD sensor and preamplifier, shown generally as 68, is operatively connected to the eyepiece to convert the optical image into a video signal. The video signal is ultimately processed by a video signal processing means, for example 134 in FIG. (8), to produce a video image on a monitor or video signals for storage of the video image on magnetic tape or other storage means.

The laparoscope 30 may include a plurality of channels which can be used for a number of functions. Several species or embodiments of laparoscopes are disclosed herein in FIGS. 1 through 7 to show that the present invention can be used with a wide variety of endoscopes or optical instruments.

Figure 2:
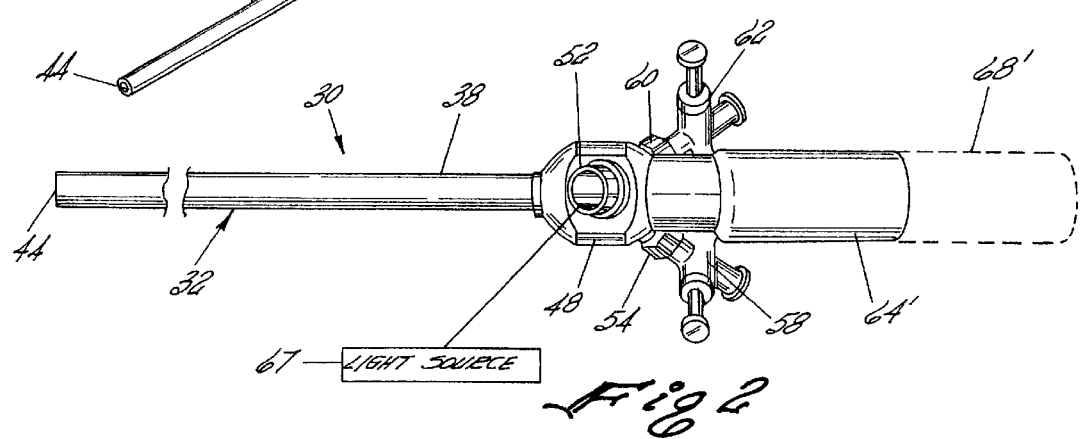
FIG. 2 is a partial top plan sectional view showing the proximal end of another embodiment of a laparoscope having a video sensor directly operatively attached thereto for practicing this invention.

FIG. 2 shows the proximal end of another embodiment of a laparoscope 30 having a video sensor housing, shown generally as 64', which is adapted to have a video sensor 68' directly operatively attached thereto for practicing this invention. In addition, FIG. 2 illustrates pictorially that a light source 67 is operatively coupled to the light post 52. The light post 52 is operatively connected to a fiber optic light guide shown as 72 in FIG. 4. The fiber optic light guide transmits the light energy from the light post 52 located at the proximal end 38 of the laparoscope 30, through the rigid elongated sheath tube 32 to the distal section or end 36. The light energy is then is directed onto the operative site or inspection area to illuminate the same.

Typically the light sources are metal halide, xenon light sources or other similar devices. The light energy from the light source 67 is in the form of a light beam or radiation beam that has defined spatial distribution characteristics which generally includes that center thereof has higher brightness than the periphery or edges thereof. The light energy is applied to the fiber optic light guide, or light guide in other optical instruments, through a light post or equivalent device such as a coupling lens or cone system.

The fiber optic light guide, as well as the other light guides, transmits the light energy and retains the defined spatial distribution characteristics of the light energy. The light energy is directed onto the operative site or inspection area to illuminate the same. The reflected light returned from the cosine angle of the reflecting surface is transmitted by the optical image transferring system to the proximal end of the optical instrument 30 where the optical image having the differential picture brightness developed by the spatial distribution characteristics of the light energy, is imaged on the video sensor 68'. In the alternative, the optical image can be sampled or sensed, using digital sampling and measuring techniques which are well known in the art, and a correction or compensating signal based thereon can be developed and applied to video amplifiers to reduce the gain in the bright areas and increase the gain in the dark areas to produce a video signal representing an optical image having substantially even field illumination.

In FIG. 2, the fiber optic light guide used for illumination of the operative site or inspection area can be varied in structure as illustrated in the embodiments of FIGS. 4 through 7 as described herein below. However, the non-uniform characteristics of a light source 67 is are transmitted through the light guide in the optical instrument to the distal end and illuminates the operative site or inspection area which produces the optical image having a differential picture brightness due to uneven illumination.

Figure 3:
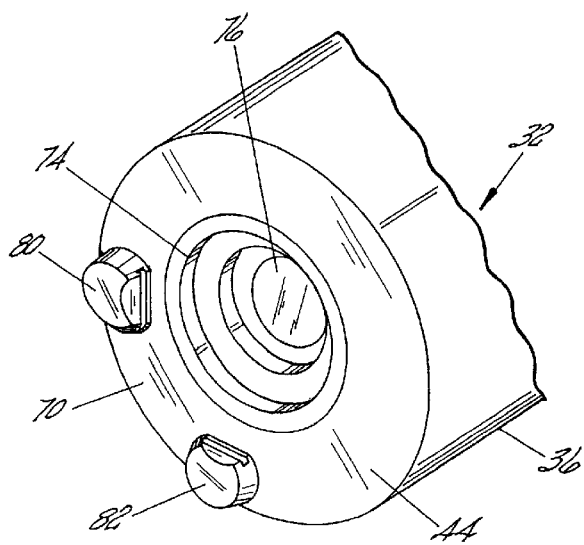
FIG. 3 is a distal section perspective view of on embodiment of a laparoscope of FIG. 1 showing the distal tip having a transparent member for passing an optical image, the location of the fiber optic light guide around the periphery of the laparoscope and two nozzles for directing fluid across the exterior surface of the transparent member.

FIG. 3 shows another embodiment of a distal end of a laparoscope utilizing the teachings of the present invention. In the embodiment of FIG. 3, the distal tip 44 includes means which are located within the rigid elongated sheath tube 32 for defining at the distal end 36 a means for directing a fluid flow across the exterior surface of an image passing means shown generally as 76. Image passing means 76 including the distal end of the optical image transferring system of member is located in the center of an aperture 74. In FIG. 3, the image passing means may be a distal lens, a window or transparent surface for a CCD sensor, or video sensor or the like. In FIG. 3, the means for directing fluid flow across the exterior surface is shown generally as nozzle 80. The nozzle 80 is located in the space shown as 70 which houses a fiber optic light guide means which is shown in great detail in FIGS. 4 through 7.

Figure 4:
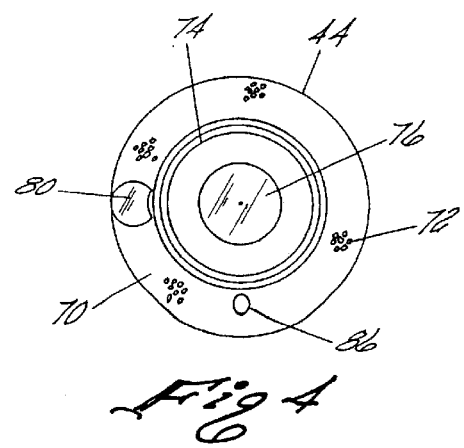
FIG. 4 is a distal end elevational view showing another embodiment of a laparoscope having a single nozzle for directing fluid across the exterior surface of the transparent member and the location of the fiber optic light guide around the periphery of the laparoscope and nozzle.

FIG. 4 shows yet another embodiment of a laparoscope having a nozzle and irrigation channel. Specifically, the distal end 44 of the laparoscope includes a transparent member 76 which is located in the aperture opening 74. In FIG. 4, the nozzle 80 which is located in space 70, directs a fluid flow across the exterior surface of the transparent member 76 and second channel 86 functions as an irrigation orifice. Of course, such a nozzle is not required to practice this invention, but keeping the transparent member clear of image impeding material substantially improves the quality of the optical image passed by the endoscope.

The light fibers forming the fiber optic light guide 72 are located around the optical image transferring system or member and are positioned around the various orifices and nozzles as depicted in FIG. 4.

Figure 5:
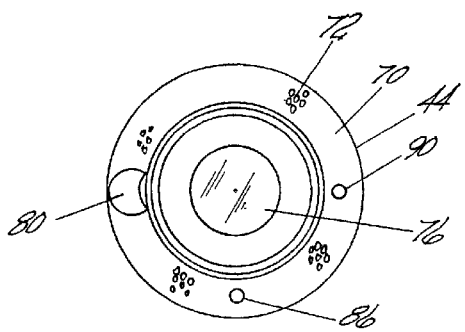
FIG. 5 is a distal end elevational view of yet another embodiment of FIG. 4 showing an additional working channel and orientation of the fiber optic light guide.

FIG. 5 illustrates the structure of a distal end of a laparoscope similar to the illustrated in FIG. 4 with the addition of a third channel 90 which can be used for other uses during surgery, such as for example as an aspiration orifice.

Figure 6:
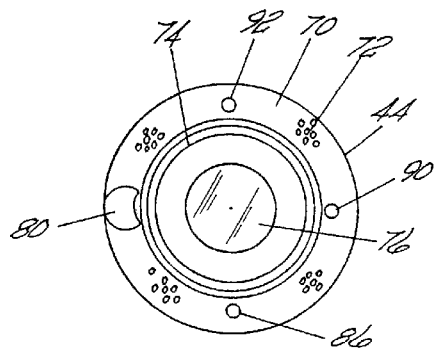
FIG. 6 is a distal end elevational view of yet another embodiment of FIG. 5 having a fourth channel and orientation of the fiber optic light guide.

FIG. 6 illustrates the structure of yet another distal end of a laparoscope similar to the illustrated in FIG. 5 with the addition of a fourth channel 92. Channels 86, 90 and 92 are equally space around the optical image transferring system or optical image transferring member. As in FIG. 4, the light fibers forming the fiber optic light guide 72 are located around the optical image transferring system or member and are positioned around the various orifices and nozzles.

Figure 7:
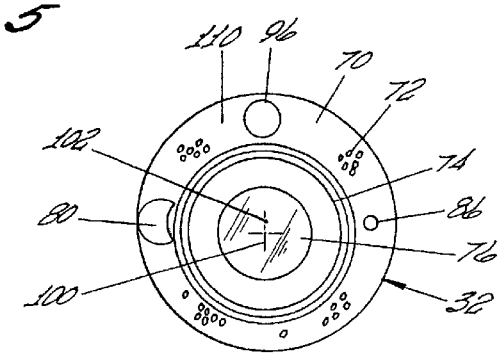
FIG. 7 is a distal end elevational view of yet another embodiment of a laparoscope having a nozzle, an irrigation flow orifice, which could be utilized as a first working channel, and an accessory or working channel which is larger that the first channel and which is adapted to pass working accessories and orientation of the fiber optic light guide.

FIG. 7 illustrates yet another embodiment of a laparoscope wherein the distal end 44 has a different structure than the ran structures of FIGS. 3 through 6. One difference is that the transparent member 76 is of center relative to the elongated sheath tube 32. As such, the aperture opening 74 is off center relative to the elongated axis 102, but is coaxial with the central axis 100 of the transparent member 76. As a result of the offset of the axis 100 and 102, an expanded space shown generally as 110 is provided between the rigid elongated sheath tube 32 and the optical image transferring member located within the laparoscope. A working channel 96 is provided in the expanded space 110. The light fibers forming the fiber optic light guide 72 are located around the optical image transferring member and are positioned around the various orifices, nozzles and working channels.

In each of the structures of the distal ends of endoscopes illustrated by FIGS. 2 through 7, the fiber optic light guide 72 directs the light energy out of the distal end and, in each embodiment, the light energy retains the non-uniform or unevenness in illumination of the light source, e.g., light source 67 as shown in FIG. 2. Of importance, the compensating apparatus or video signal compensator are operative with any of the optical images developed by the endoscopes illustrated in FIGS. 1 through 7 to produce a video signal representing an optical image having substantially uniform brightness due to uneven illumination.

In the alternative, the fiber optic light guide 72 could be eliminated and electrical conductors could be extended through the endoscope to the light bulb or light source located at the distal end. The light bulb or light source could be located in the position shown by working channel 96 in FIG. 7.

Figure 8:
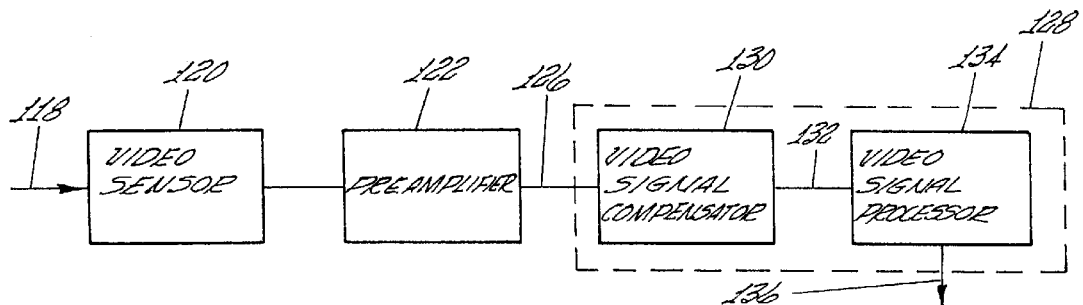
FIG. 8 is block diagram of an analog video camera having the video signal compensator located between a preamplifier and video signal processor.

FIG. 8 illustrates a preferred embodiment of a compensating apparatus for practicing this invention. An optical image having differential picture brightness due to uneven or non-uniform illumination (the term "uneven illumination" being use to describe this characteristic) developed from an optical instrument having a light guide operatively coupled to a light source is illustrated by arrow 118. The optical image having differential picture brightness due to uneven illumination 118 is imaged directly onto a video sensor 120. The output from the video sensor is an analog video signal which is applied to a preamplifier 122.

The video sensor 120 and preamplifier 122 are generally located with or operatively attached to the optical instrument as described in connection with FIGS. 1 and 2. In such event, electrical conductors 124, which are operatively connected to the preamplifier 122, extend from the proximal end of a laparoscope to a remotely disposed video signal processing apparatus depicted by dashed box 128. The video signal processing apparatus 128 includes a video signal compensator or compensating apparatus 130.

The video signal compensator or compensating apparatus 130 performs the function of generating a compensating signal which is used to compensate the video signal representing the optical image having differential picture brightness due to uneven illumination 118. The compensating signal of the video signal compensator or compensating apparatus 130, shown as output 132, is applied as an input to a standard analog video signal processor 134 which processes video signals to produce an analog video in a preselected format, e.g., NTSC, Y/C, RGB or other Format.

When the compensating signal on output 132 is added to the input of the video signal processor 134, the output from the video signal processor 134, appearing on output 136, is a video signal compensated to represent the optical image having substantially uniform brightness. The compensated video output signal on output 136 is applied to a monitor, video storage device, printer or other video device depicted by box 138.

As shown in FIG. 8, the video signal compensator 130 is located between the preamplifier 122 and the video signal processor 134. The advantages of locating the video signal compensator 130 in this position is that the video signal is in analog format as it is generated by the CCD sensor. The preamplifier generally performs the function of providing sufficient amplification of the analog video signal to drive the electrical conductors with the analog video signal to deliver an amplified video signal to the remote video signal processor. Another advantage is that the preamplifier video signal and compensating signal can be added at the front end to the video signal processor such that the video signal processor process a compensated video signal.

Figure 9:
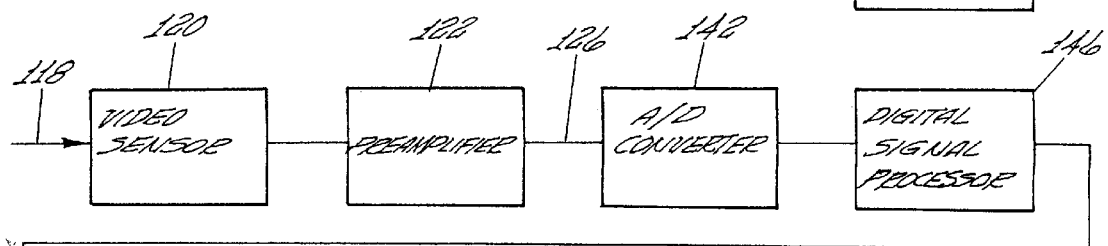
FIG. 9 is a block diagram of a digital video camera having a preamplifier, digital-to-analog converter, digital signal processing, analog-to-digital converter with the video signal processor located after the analog-to-digital converter.
Figure 9:
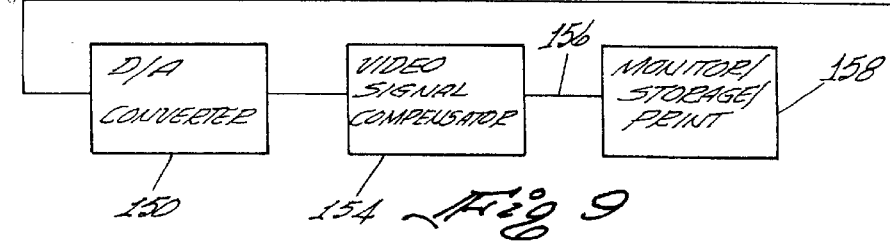

However, it is also possible to add the compensating signal to the video signal after processing of the video signal. For example, FIG. 9 illustrates a typical digital video camera. In FIG. 9, the optical image having differential picture brightness due to uneven illumination 118 is imaged directly onto a video sensor 120. The output from the video sensor is an analog video signal which is applied to a preamplifier 122 as described above relative to FIG. 8.

The amplified video signal appearing on output 126 is applied to an analog-to-digital converter 142, the output of which is a digitized video signal representing the optical image having differential picture brightness due to uneven illumination. The output of the analog-to-digital converter 142 is applied to a digital signal processor 146 where the output signal is a processed analog video signal representing the optical image having differential picture brightness due to uneven illumination. The output of the digital signal processor 146 is applied to a digital-to-analog converter 150, the output of which is an analog signal in a standard or preselected format, such as an NTSC, Y/C, RGB or other Format video signal. A video signal compensator 154, utilizing the teachings of this invention, then produces a compensating signal in the preselected format which is added to and compensates the video signal to represent an optical image having substantially uniform illumination. The compensated output signal appearing on output 156 is applied to a monitor, video storage device, printer or other video device depicted by box 158.

Figure 10:
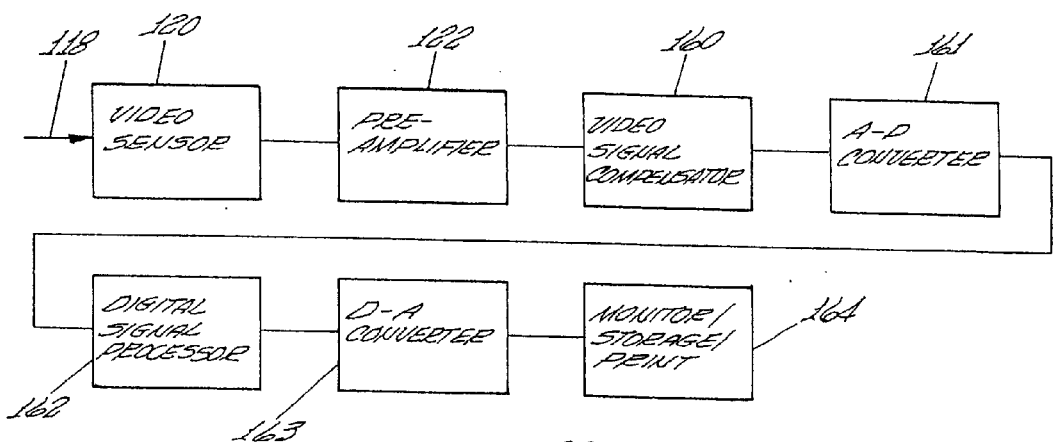
FIG. 10 is a block diagram of another embodiment of a digital video camera having a preamplifier, video signal compensator, digital-to-analog converter, digital signal processor, analog-to-digital converter and a monitor illustrating that the video signal processor is located before the analog-to-digital converter.
Figure 11:
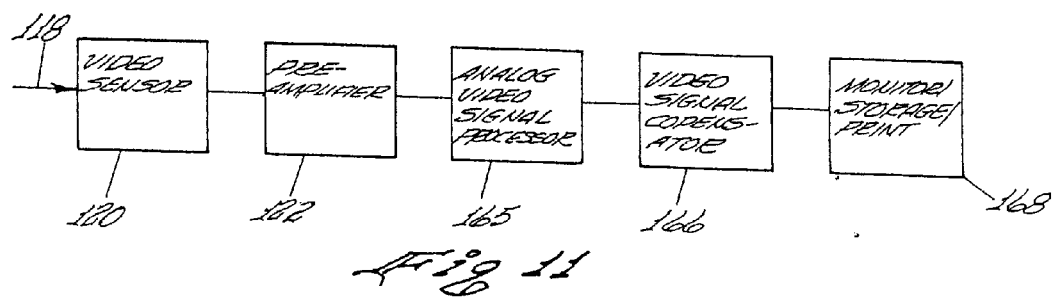
FIG. 11 is a block diagram of another embodiment of a analog video camera having a video sensor, preamplifier, analog video signal processor, video signal compensator and a monitor illustrating that the video signal processor is located after the analog video signal processor.

The compensating. waveform may also be added to the analog or digital signal processor. FIGS. 10 and 11 discussed below are exemplary.

In FIG. 10, the compensating signal is added to the video signal before digital processing of the video signal. For example, FIG. 10 illustrates a digital video camera wherein the optical image having differential picture brightness due to uneven illumination 118 is imaged directly onto a video sensor 120. The output from the video sensor is an analog video signal which is applied to a preamplifier 122 as described above relative to FIG. 8.

The amplified video signal from the preamplifier 122 is applied to an analog-to-digital converter 160, the output of which is a compensated analog video signal representing the optical image having differential picture brightness due to uneven illumination. The output of the video signal compensator 160 is applied to an analog-to-digital converter 161 wherein the digital signal is applied to a digital signal processor 162. The output of the digital signal processor 162 is a digitized compensated video signal which is applied to a digital-to-analog converter 163 wherein the output signal from the digital-to-analog converter 163 is a processed analog video signal representing the optical image having differential picture brightness due to uneven illumination. The output of the digital-to-analog converter 163 is applied to a monitor, video storage device, printer or other video device depicted by box 164.

FIG. 11 illustrates another embodiment of a typical analog video camera having a video signal compensator located after the analog video signal processor. In FIG. 11, the optical image 118 having differential picture brightness due to uneven illumination 118 is imaged directly onto a video sensor 120. The output from the video sensor 120 is an analog video signal which is applied to a preamplifier 122 as described above relative to FIG. 8.

The amplified video signal from the preamplifier 122 is applied to an analog video signal processor 165. The output from the analog video signal processor 165 is applied to a video signal compensator 166 where the output signal is a processed analog video signal representing the optical image having differential picture brightness due to uneven illumination. The output of the video signal compensator 166 is in a standard or preselected format, such as an NTSC, Y/C, RGE or other Format video signal. The video signal compensator 166, utilizing the teachings of this invention, produces a compensating signal in the preselected format which is added to and compensates the video signal to represent an optical image having substantially uniform illumination. The compensated output signal from the video signal compensator 166 is applied to a monitor, video storage device, printer or other video device depicted by box 168. It is envisioned that the video signal compensator could be used at numerous locations in the video signal circuit path, or even in the digital signal processor.

Figure 12A:
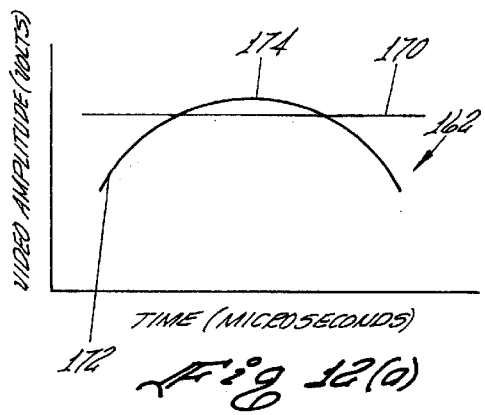
FIG. 12($a$) and FIG. 12($b$) represent graphs showing: (i) the brightness of the optical image presented by a video signal having a differential picture brightness where the center is brighter than a reference level and the periphery is less bright than a reference level; and (ii) the brightness of the optical image represented by a video signal after adjustment by the video signal processor in response to a compensating signal which has been added to the video signal compensating the video signal to represent the optical image having a substantially uniform brightness, respectively.

FIG. 12(a) is a graph of the video signal depicted by waveform 162 representing the optical image having differential picture brightness due to uneven illumination. The reference line for brightness is shown as 170. The portion shown as 172 of the waveform 170 represents that part of the optical image 118 which is less bright than a reference 170 and the portion shown as 174 shows that part of the optical image which, at its peak, is brighter than the reference 170.

Figure 12B:
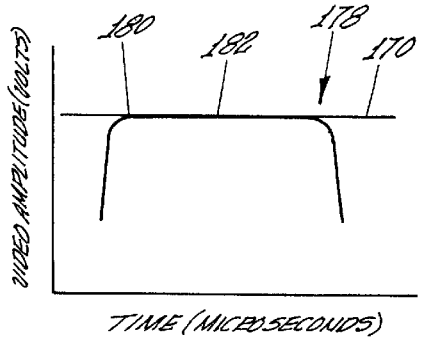

FIG. 12(b) is a graph of the compensated video signal depicted by waveform 178 representing the optical image after the gain of the video signal has been compensated by the compensating signal generated by the video signal compensator 130 of FIG. 8. The reference line for brightness is shown as 170. The portion shown as 180 of the waveform 178 represents that part of the optical image 118 which was less bright than a reference 170 output video signal and its gain both vertically and horizontally was compensated by increasing the gain of the video signal representing that part of the optical image which was less bright than the reference 170.

With respect to the portion of the compensated video signal shown as 182 which was brighter than the reference 170, its gain was compensated both horizontally and vertically by reducing the gain of the video signal compensating the video signal to represent an image having a substantially uniform brightness.

Figures 13A, 13B, 14:
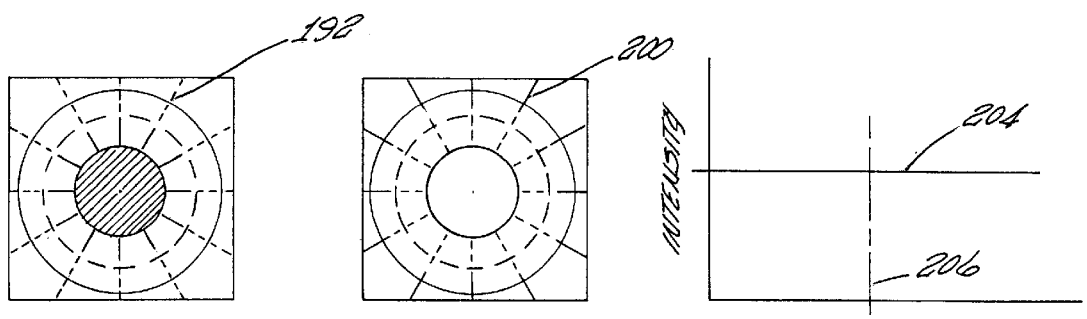
FIG. 14 is a pictorial representation of a compensated video signal of an optical image having a substantially uniform brightness.

FIG. 13(a) pictorially represent an optical image wherein the differential picture brightness of an optical image is brighter at its center 188 than at its periphery 190. The solid portion of lines 192 depict a decreasing brightness of the optical image while the dashed portions of line 192 depict the less brightness as the brightness of the optical image drops of to the periphery 192 which is less bright.

FIG. 13(b) pictorially represent an optical image wherein the differential picture brightness of an optical image is brighter at its periphery 196 than at its center 188. The solid portion of lines 200 depict a decreasing brightness of the optical image while the dashed portions of line 200 depict the less brightness as the brightness of the optical image is less bright at the center 198.

FIG. 14 is a pictorial representation of a line 204 representing the top portion of an envelope of a compensated video signal plotting the intensity as a function of distance "S" from the axis of the image 206. As shown by the line 204, the compensated video signal is amplified by a controlled device such as a controlled gain amplifier or variable gain amplifier to increase the brightness of the output video signal to a level which is greater than the average of the differential brightness of the optical image due to the uneven illumination.

Figure 16:
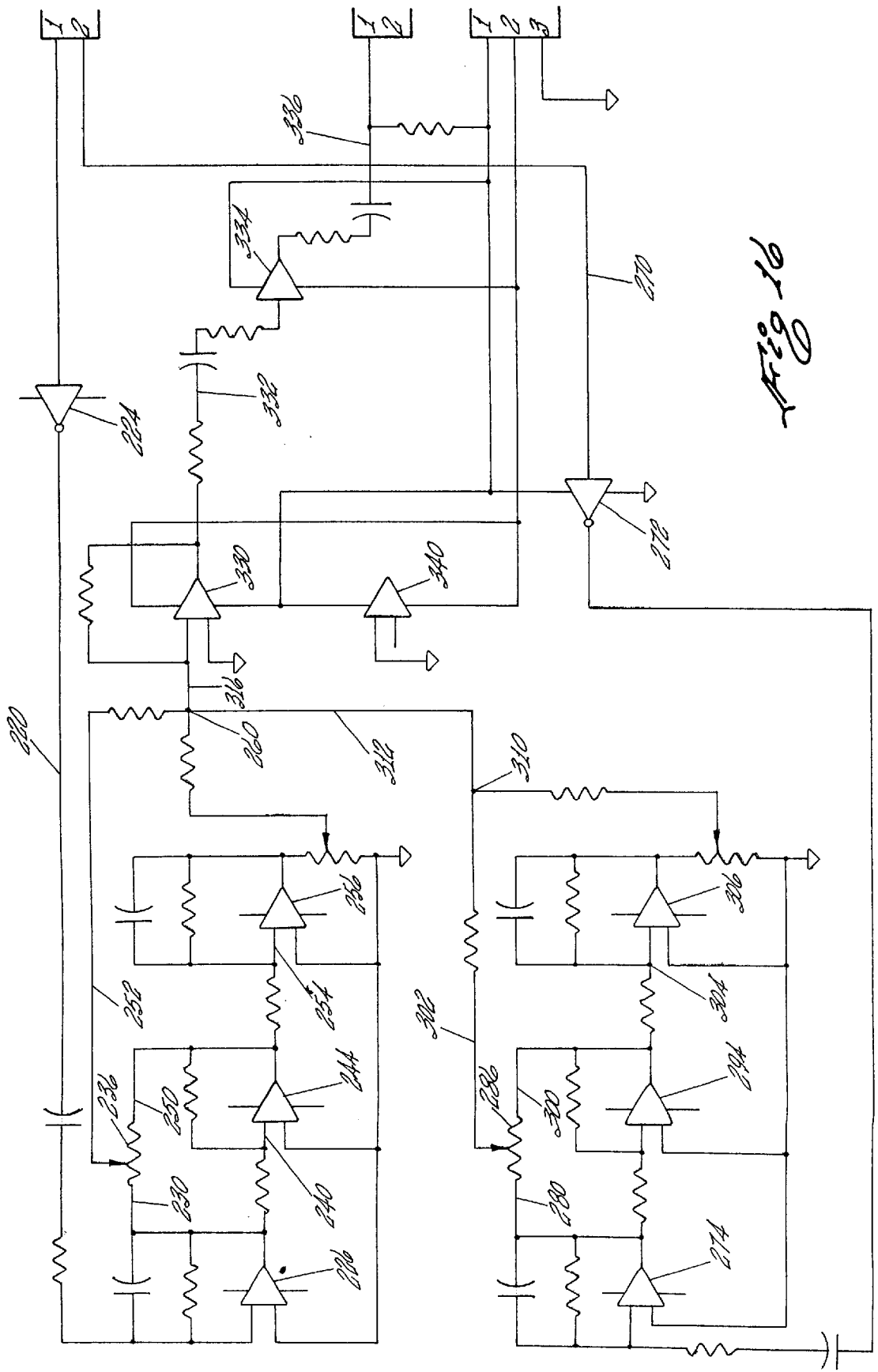
FIG. 16 is a schematic diagram of the preferred embodiment of a video signal compensator of the present invention adapted to be located in a video camera at a location illustrated in FIG. 8.

Before describing the operation of the schematic diagram of FIG. 16 which is of the embodiment of the video signal compensator 134 illustrated in FIG. 8, the following discussion relates to the form of the basic waveforms that are used in the video signal compensator for compensating differential picture brightness of an optical image due to uneven illumination.

The video signal compensator comprises a device for generating a compensating signal substantially representing at least one parameter of a compensating waveform required for the differential picture brightness of an optical image to produce a video signal representing an optical image having a substantially uniform brightness. In the schematic diagram of FIG. 16, the video signal compensator is an analog signal generating device.

The video signal compensator includes a sawtooth wave generator for generating a sawtooth waveform having a predetermined rising slope and a sawtooth wave generator for generating a sawtooth waveform having a predetermined falling slope.

Figures 15A, 15B, 15C:
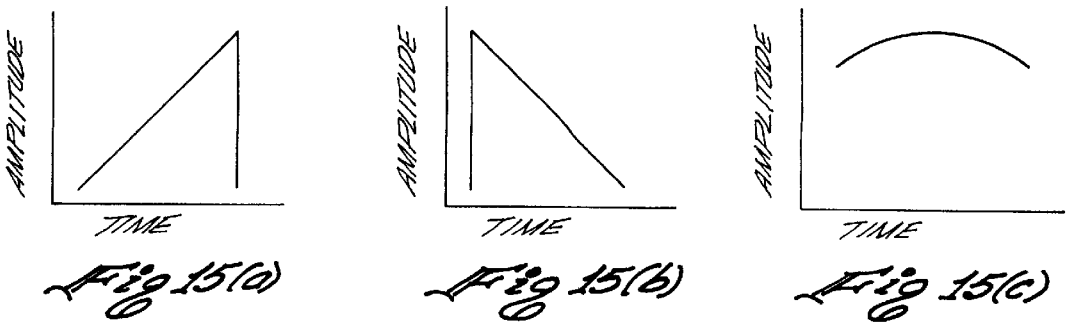
FIGS. 15($a$), 15($b$) and 15($c$) are waveforms of a sawtooth wave generator having an increasing slope, a waveform of a sawtooth wave generator having an decreasing slope and a waveform of a parabolic wave generator having controlled amplitude and orientation, respectively.

FIG. 15(a) is a sawtooth waveform 210 having a predetermined rising slope and a controlled amplitude. FIG. 15(b) is a sawtooth waveform 212 having a predetermined falling slope and a controlled amplitude.

The video signal compensator also includes a parabolic wave generator for generating a parabolic waveform having a controlled amplitude and orientation.

FIG. 15(c) is a parabolic waveform 214 having a controlled amplitude and orientation. If the orientation of the parabolic waveform is reversed, it is referred to as an "inverted parabolic waveform."

The amplitude and slope of the sawtooth waveform and the amplitude and the orientation of the parabolic waveform are adjusted as required to generate an acceptable compensating signal. In operation, an analog signal adder operatively coupled to the sawtooth wave generator and the parabolic wave generator adds the sawtooth waveforms and the parabolic waveform to produce a compensating signal. The compensating signal is used to compensate the video signal representing the optical image having differential picture brightness due to uneven illumination.

Referring now to the schematic diagram of FIG. 16, the circuit is based on the use of two (2) quad operating amplifiers. In operation, the horizontal synchronizing signals of the composite video signal are applied to lead 220 and inverted by amplifier 224. If the horizontal synchronizing signals of the composite video signal are of proper polarity, then inversion of the signals will not be necessary. The output of amplifier 224 is applied as an input to amplifier 226 which is used as the sawtooth wave generator to generate a sawtooth waveform in the form of sawtooth waveform 210 of FIG. 15(a) having a predetermined rising slope and a controlled amplitude. The output of the sawtooth wave generator 226 applies the sawtooth waveform to lead 230 which forms one side of a sawtooth waveform balance network 236. The output of the balance network 236 is adjusted as required to produce an acceptable balance using the sawtooth waveform by the variable pot, variable resistor or potentiometer depicted as balance network 136. The output from balance network 136 appears on lead 252.

In addition, the output of the sawtooth wave generator 226 applies the sawtooth waveform to lead 240 which is an input to amplifier 244. Amplifier 244, which essentially functions as a sawtooth wave inverter, inverts the sawtooth waveform having a predetermined rising slope and a controlled amplitude to generate a sawtooth waveform having a predetermined falling slope and controlled amplitude in the form of sawtooth waveform 212 of FIG. 15(b). The output of the amplifier 244, applies the sawtooth waveform to lead 250 which forms the other side of a sawtooth waveform balance network 236.

The output of the amplifier 244 is applied to input 254 of an amplifier 256 which functions as a parabolic wave generator. Amplifier 256, produces as an output a parabolic waveform having a controlled amplitude and orientation in the form of parabolic waveform 214 of FIG. 15(c) having a controlled amplitude and orientation. In the preferred embodiment, the parabolic waveform is an inverted parabolic waveform.

Lead 252, which is the output of the balance network 136 is operatively connected to a summation terminal 260 which is an analog adder. The balance or mix of the sawtooth waveforms received by inputs 230 and 250, respectively, are controlled by the adjustment of the balance network 236. In addition, the output of the amplifier 256, which functions as a parabolic waveform generator, applies the parabolic waveform having a controlled amplitude and orientation to the summation terminal 260, to produce the horizontal component of the compensating signal.

The vertical portion of the compensating signal is generated as follows. The vertical synchronizing signals of the composite video signal is applied to lead 270 and inverted by amplifier 272. If the vertical synchronizing signals of the composite video signal are of proper polarity, then inversion of the signals will not be necessary. The output of Amplifier 272 is an input to amplifier 274 which issued as the sawtooth wave generator to generate a sawtooth waveform in the form of sawtooth waveform 210 of FIG. 15(a). The output of the sawtooth wave A generator 274 applies the sawtooth waveform to lead 280 which forms one side of a sawtooth waveform balance network 286. The output of the balance network 302 is similarly adjusted by the variable pot, variable resistor or potentiometer depicted as balance network 286 and the output appears on lead 302.

In addition, the output of the sawtooth wave generator 274 applies the sawtooth waveform to lead input 290 of an amplifier 294. Amplifier 294, which essentially functions as a sawtooth wave inverter, inverts the sawtooth waveform having a predetermined rising slope and a controlled amplitude to generate a sawtooth waveform having of FIG. 15(b). The output of the amplifier 294, which also functions as a sawtooth wave inverter, applies the sawtooth waveform to lead 300 which forms the other side of a sawtooth waveform balance network 286.

The output of the amplifier 294 is applied to input 304 of an amplifier 306 which functions as a parabolic wave generator. Amplifier 306, produces as an output a parabolic waveform having a controlled amplitude and orientation in the form of parabolic waveform 214 of FIG. 15(c). In the preferred embodiment, the parabolic waveform is an "inverted parabolic waveform."

Lead 302 of the output of the balance network 286 is operatively connected to a summation terminal 310 which is an analog adder. The balance or mix of the sawtooth waveform received by inputs 280 and 300, respectively, are controlled by the adjustment of the balance network 286. In addition, the output of the amplifier 306, which functions as a parabolic waveform generator, applies the parabolic waveform having a controlled amplitude and orientation to the summation terminal 310, or analog adder, to produce the vertical component of the compensating signal.

The horizontal portion of the compensating signal appearing on the summation terminal 260 and the vertical portion of the compensating signal appearing on the summation terminal 260 are applied to summation terminal 316 which produces the compensating signal required to compensate the video signal to represent the optical image having substantially uniform brightness. The compensating signal appearing on summation terminal 316 is applied as an input to controlled gain amplifier 330 which amplifies the compensating signal to the desire level.

Amplifier 340 is unused. The output of the controlled gain amplifier 330 has a high impedance relative to the video signal to be compensated in the video signal processor, illustrated as 134 in FIG. 8. Therefore, the output of the amplifier 330 is applied to input 332 of a video driver 334 which produces a compensating signal on output 336 at a low impedance. Output 336 is then applied to the preamplifier stage of the video signal processor 134 of FIG. 8 as is well known to a person skilled in the art. An adder in the video signal processor 134 is used to add the compensating signal and video signal to produce the compensated video signal.

Based on the above description, it is readily apparent that the video signal compensator is a device for generating a compensating signal substantially representing at least one parameter of a compensating waveform required for the differential picture brightness of an optical image to produce a compensating signal. For example, the parabolic waveform would be used alone if one of a sawtooth wave generator and a parabolic wave generator was used to practice the teachings of this invention, a compensating signal would be generated which compensates the video signal to represent at least an improved optical image having substantially uniform brightness. In the preferred embodiment, both the sawtooth waveforms and the parabolic waveform are used produce the compensating signal used to compensate an uncompensated analog video signal to represent an optical image having substantially uniform brightness.

As described above, the compensating signal is added to the video signal at the input of a video signal processor 134 to produce a compensating video signal. The video signal process is responsive to the compensating signal by adjusting the gain both vertically and horizontally by increasing the gain of the video signal representing that part of the optical image which is less bright than a reference and reducing the gain of the video signal representing that part of the optical image which is brighter than a reference compensating the video signal to represent an image having a substantially uniform brightness.

In the preferred embodiment, the differential picture brightness is brighter at its center than at its periphery. The video signal compensator adder adds the sawtooth waveform, the parabolic waveform and the video signal to produce a compensating signal which is applied as an input to a video signal processor adjusting its gain both vertically and horizontally. This is accomplished by increasing the gain of the video signal in response the sawtooth waveform representing the periphery of the optical image and by reducing the gain of the video signal in response to the parabolic waveform representing the center of the optical image resulting in the video signal representing an optical image having a substantially flat brightness.

In the event that the differential picture brightness of an optical image is brighter at its periphery than at its center. The adder adds the sawtooth waveform, the parabolic waveform and the video signal to produce a compensating signal which is applied as an input to a video signal processor together with a compensating signal producing a compensated video signal. The compensated video signal is used to adjust the gain of the video signal processor both vertically and horizontally. This is accomplished by decreasing the gain of the video signal in response the sawtooth waveform representing the periphery of the optical image and by increasing the gain of the video signal in response to the parabolic waveform representing the center of the optical image resulting in said video signal representing an optical image having a substantially flat brightness.

FIGS. 1 through 16 disclose the elements or components of a preferred embodiment of a system for practicing this invention. The system includes an endoscope 30 having a proximal end 38 and a distal end 36. A light guide 72 is located within the endoscope and extends from the proximal end 38 to the distal end 36 of the endoscope 30. The light guide 72 has a light post 52 at its proximal end which is adapted to receive light energy from a light source 67 and to transmit the light energy from its distal end to illuminate an operative site.

In the alternative, the light guide 72 could be eliminated and an illumination source such as a light bulb could be located directly at the distal end 36 of the endoscope 30.

The endoscope includes an optical image transferring member, included as part of element 76, which extends from the proximal end 38 to the distal end 36 of the endoscope. A light source 67 is operatively connected to the light post 52 to apply light energy to the light guide 72. A video sensor 68 is operatively coupled to the proximal end of the endoscope 30 for imaging an optical image having differential picture brightness due to uneven illumination.

A compensating apparatus is operatively coupled to the video sensor and includes a sawtooth wave generator for generating a sawtooth waveform having a predetermined rising slope, a predetermined falling slope and a controlled amplitude. In addition, the compensating apparatus includes a parabola wave generator for generating a parabola waveform having a controlled amplitude and orientation. An adder is operatively coupled to the sawtooth wave generator, the parabolic wave generator and a video signal for adding the sawtooth waveform and the parabolic waveform to produce a compensating signal which is used as an input to a video signal processor adjusting its gain both vertically and horizontally. This is accomplished by increasing the gain of the video signal representing that part of the optical image which is less bright than a reference and reducing the gain of the video signal representing that part of the optical image which is brighter than a reference compensating the video signal to represent an image having a substantially uniform brightness.

Also, the preferred embodiment of the endoscope includes a light guide 72 which is a fiber optic light guide and the laparoscope having a fiber optic light guide independent of the distal end of the endoscope produces and optical image having a differential picture brightness which is brighter at its center than at its edges.

Figure 17:
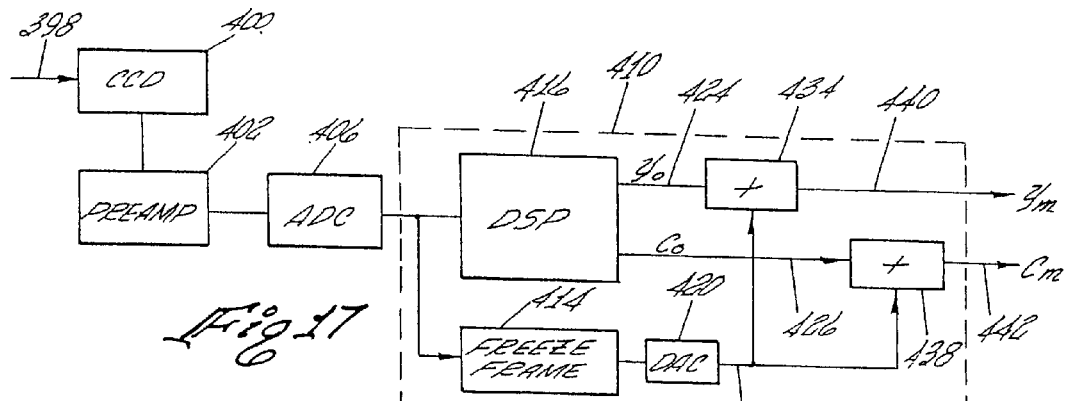
FIG. 17 is a block diagram of a digital video camera having a digital storage device for storing a digital representation of the video signal having the differential brightness due to uneven illumination cross-sectional and a digital signal processor for generating a digital compensating signal which is converted by a digital-to-analog converter to an analog signal before being applied to an adder to produce a compensated analog video output signal from the digital signal processor.

In the embodiment of FIG. 17, an optical image having differential picture brightness due to uneven illumination 398 is imaged directly onto a CCD sensor 400. The output from the video sensor 400 is an analog video signal which is applied to a preamplifier 402. The preamplified video signal is applied to an analog-to-digital converter 406. The video signal compensator in this embodiment is a part of a digital signal processing device shown by dashed lines 410.

The digital signal processing device 410 includes a digital storage device or freeze frame 414 for storing a digital representation of the video signal having the differential brightness due to uneven illumination received from the analog-to-digital converter 406. Concurrently, the digital video signal from the analog-to-digital converter 406 is applied to a digital signal processor 416 for digitally processing the digital representation of the video signal. The digital processor 416 produces a digital compensating signal representing at least one parameter of a compensating waveform required for the differential picture brightness of an optical image to produce a video signal representing an optical image having a substantially uniform brightness. The digital processor 416 digitally calculates the components of the compensating signal using a sawtooth waveform reference and a parabolic waveform reference in a process analogous to that of the analog process described above for the analog processing, except however, the calculation is performed digitally. The output form the digital signal processor 416 is a compensating signal in analog format having an illumination signal $Y_o$ and color signal $C_o$. Illuminates signal $Y_o$ appears on lead 424 and color signal $C_o$ to appears on lead 426.

The video signal is stored in the digital storage device 414 for a predetermined period of time and is applied to a digital-to-analog converter 420. The output from the digital-to-analog converter 420 is the analog video signal representing the output image 390 delay by a predetermined time period. The output from the digital-to-analog converter 420 appears on output 430.

The illumination signal $Y_o$ on lead 424 is applied as an input to first adder 434. The color signal $C_o$ on lead 426 is applied as an input to a second adder 438. The delayed uncompensated analog video signal on output 430 is applied to each of the first inputs of the adders 434 and second adder 438.

The analog output from the first adder 434 is in the form of a compensated illumination signal $Y_m$ which appears on output lead 440. The analog output from the second adder 438 is in the form of a compensated color signal $C_m$ which appears on output lead 442. The output video signal represents the optical image having substantially uniform brightness and is applied to a device shown by 138 in FIG. 8.

Figure 18:
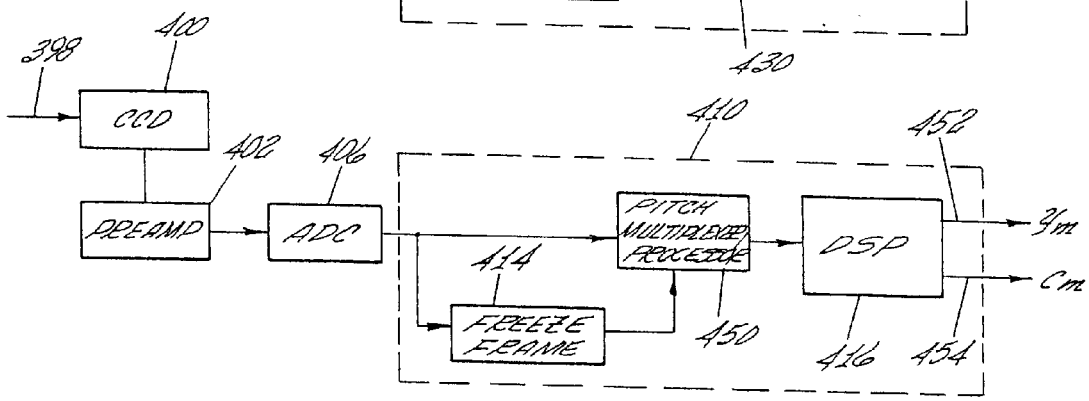
FIG. 18 is a block diagram of a digital video camera having a different embodiment of a video signal compensator having a digital storage device for storing a digital representation of the video signal having the differential brightness due to uneven illumination cross-sectional and a programmable digital processor having an 8×8 pixel multiplexer/processor for producing a compensated analog video output signal.

In the embodiment of FIG. 18, the initial components are the same as described in FIG. 17 and include the optical image having differential picture brightness due to uneven illumination 398 being imaged directly onto a CCD sensor 400. The output from the video sensor 400 is an analog video signal which is applied to a preamplifier 402. The preamplified video signal is applied to an analog-to-digital converter 406. The video signal compensator in this embodiment is a part of a digital signal processing device shown by dashed lines 410.

At this point, the embodiment of FIG. 18 differs from that of FIG. 17. In the embodiment of FIG. 18, the digital signal processing device 410 includes a digital storage device or freeze frame 414 for storing a digital representation of the video signal having the differential brightness due to uneven illumination received from the analog-to-digital converter 406. Concurrently, the digital video signal from the analog-to-digital converter 406 is applied to a programmable digital processor shown by dashed box 410' for digitally processing a digital representation of the video signal representing the differential picture brightness of the optical image due to uneven illumination. The digital signal processor 410' produces a digital compensating signal representing at least one parameter of a compensating waveform required for the differential picture brightness of an optical image to produce a video signal representing an optical image having a substantially uniform brightness. In this embodiment the programmable digital processor 410' includes an 8×8 pixel matrix multiplexer/processor 450.

The video signal is stored in the digital storage device 414 for a predetermined period of time to enable the 8×8 pixel matrix multiplexer/processor 450 to digitally calculate the components of the compensating signal using a sawtooth waveform reference and a parabolic waveform reference in a process analogous to that of the analog process described above for the analog processing, except however, the calculation is performed digitally. The 8×8 pixel matrix multiplexer/processor 450 analyzes the brightness level of the optical image represented by the video signal on a bit-by-bit bases against a brightness reference to determine the required compensating signal for the horizontal and vertical components thereof. The output of the 8×8 pixel matrix multiplexer/processor is a digital signal.

The output from the digital storage device 414 is applied to the 8×8 pixel matrix multiplexer/processor 450 where the digital video signal is compensated with the compensating signal generated by the 8×8 pixel matrix multiplexer/processor 450.

The output from the 8×8 pixel matrix multiplexer/processor 450 is applied to the digital signal processor 416 which produces a compensated analog video signal representing the differential picture brightness substantially uniform brightness. The digital techniques for performing this analysis are well known to persons skilled in the art.

In the embodiment illustrated in FIG. 18, the analog output from the digital signal processor 416 is in the form of a compensated illumination signal $Y_m$ which appears on output lead 452 and a color signal $C_m$ which appears on output lead 454.

Figure 19:
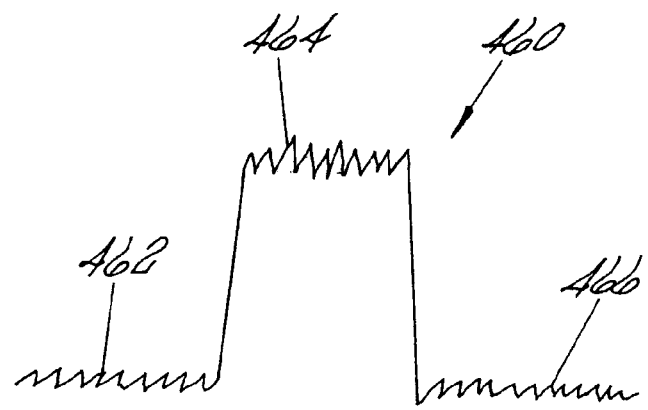
FIG. 19 is a waveform of a video signal from a small diameter endoscope illustrating the noise before and after the video signal representing the picture information.

In smaller diameter endoscopes having a diameter at the distal end in the order of about 5 mm or less, the video signal representing the optical image typically has a waveform 460 illustrated by FIG. 19. In FIG. 19, the waveform 460 has a low level noise portion of the video signal shown as element 462 which appears before the video information signal portion 464 of the video signal and a low level noise portion of the video signal shown as element 466 which appears after the video signal portion 464 representing the picture information. This low level noise portion of the video signal 460 can be monitored by a sensing device for sensing and removing the noise to improve the video signal.

Figure 20:
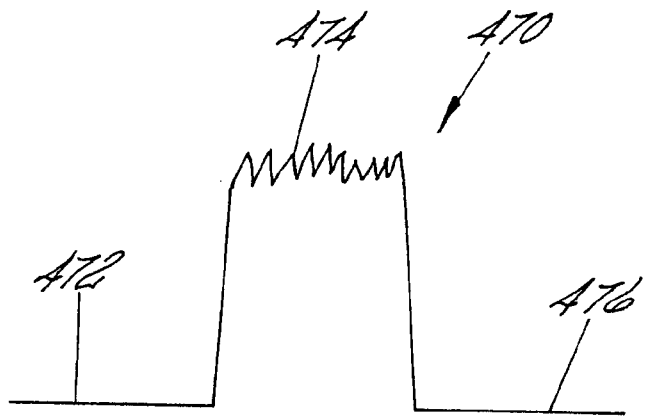
FIG. 20 is a waveform of the video signal from a small diameter endoscope illustrating the action of a sensing device for sensing and removing the noise before and after the video signal representing the picture information.

FIG. 20 illustrates a waveform 470 of the video signal from a small diameter endoscope illustrating the effects of the sensing device for sensing and removing the noise before and after the video signal. In FIG. 20, the portion of the signal shown as 472 before the information portion of the signal 474 has the noise removed therefrom. The picture portion of the video signal 474 is substantially the same as the information signal portion 464 of FIG. 19. Also, in FIG. 20, the portion of the signal shown as 476 after the information portion of the signal 474 has the noise removed therefrom. In this manner, the picture information represented by the portion of the signal 474 represents the definitive picture signal.

Figure 21:
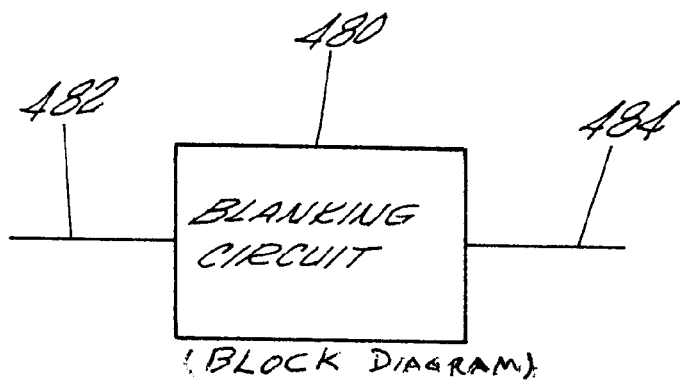
FIG. 21 is a block diagram of a sensing device for sensing and removing the noise which, in the preferred embodiment, is in the form of a blanking circuit.

In the preferred embodiment, the sensing device for sensing and removing the noise is in the form of a blanking circuit 480 as illustrated by FIG. 21. The signal appearing on input 482 to the blanking circuit 480 is essentially in the form of the waveform 460 shown in FIG. 19. The signal appearing on the output 484 of the blanking circuit is essentially in the form of the waveform 470 shown in FIG. 19. One example of a sensing device that can be used in such a blanking circuit is a Schmidt trigger which require that a certain threshold voltage level be reached by the video signal before the amplifier receives the input video signal. Of course, any known electrical system or circuit for sensing and removing the noise is envisioned to be within the teachings of this invention.

The present invention includes a method for compensating for differential picture brightness of an optical image due to uneven illumination. The method comprises the steps of: (a) generating with a compensating signal generating device a compensating signal substantially representing at least one parameter of a compensating waveform required for the differential picture brightness of an optical image to produce a video signal representing an optical image having a substantially uniform brightness; and (b) adding with an adder operatively coupled to the compensating signal generating device and a video signal the compensating video signal and the video signal to produce a compensating signal which is used as an input to a video signal processor to adjust its gain both vertically and horizontally by increasing the gain of the video signal representing that part of the optical image which is less bright than a reference and reducing the gain of the video signal representing that part of the optical image which is brighter than a reference compensating said video signal to represent an optical image having a substantially uniform brightness.

In an application where the differential picture brightness of an optical image is brighter at its center than at its edges, the method step of adding produces as an output signal a video signal having its gain both vertically and horizontally compensated by increasing the gain of the video signal in response the sawtooth waveform representing the edges of the optical image and reducing the gain of the video signal in response to the parabolic waveform representing the center of the optical image compensating said video signal to represent an optical image having a substantially flat brightness.

In an application where the differential picture brightness of an optical image is brighter at its edges than at its center, the method step of adding produces as an output signal a video signal having its gain both vertically and horizontally compensated by decreasing the gain of the video signal in response the sawtooth waveform representing the edges of the optical image and increasing the gain of the video signal in response to the parabolic waveform representing the edges of the optical image resulting in said video signal representing an optical image having a substantially flat brightness.

Where the method is an analog process, the step of adding includes a compensating signal generating device which is an analog signal generating device for generating the compensating signal. Similarly, where the method is a digital process, the step of adding includes a compensating signal generating device which is an digital signal processing device for generating the compensating signal.

If it is desired to raise the brightness level of the compensated video signal, the method further includes the step of: (a) increasing with a control device operatively coupled to the adder the brightness of the output video signal to a level which is greater than the average of the differential brightness of the optical image due to the uneven illumination. For impedance matching, the method further includes the step of: (a) applying, with a driver amplifier operatively coupled to the adder, the output video signal to a video signal processor at a low impedance.

In the preferred embodiment, the method includes the use of a compensating signal generating device which is an analog signal generating device for generating the compensating signal. The method further comprises the steps of: (a) generating with a sawtooth wave generator a sawtooth waveform having a predetermined rising slope, a predetermined falling slope and a controlled amplitude, (b) generating with a parabola wave generator a parabola waveform having a controlled amplitude and orientation; and (c) adding with an analog signal adder the sawtooth waveform, the parabolic waveform and the video signal to produce the compensating signal.

Although the preferred embodiment of the present invention is used in a medical laparoscope having a fiber optic light guide, the video signal compensator can be used with any optical system where a light source having a non-uniform or uneven characteristics is used to illuminate an operative site or inspection area providing an optical image having differentiated picture brightness due to the uneven illumination. The light source may be located intermediate the endoscope or at the distal end of the endoscope.

It is also envisioned that the teachings of the present invention can be used for industrial applications. For example, borescopes are used to inside the inspect the interior stages of jet engines. Typically, the optical image produced by a borescope is imaged directly on a video camera. The video signal compensator disclosed and taught herein can be used for such industrial applications. Further, person skilled on the art can identify other applications where the uneven brightness of an optical image can be compensated to produce a substantially uniform brightness level. It is envisioned that this invention can be used for such applications.

What is claimed is:

1. A system comprising an endoscope having a proximal end and a distal end;

a light guide located within the endoscope and extending from the proximal end to the distal end of the endoscope, said light guide being adapted to receive light energy from a light source and to transmit the light energy from its distal end to illuminate an operative site wherein differential picture brightness is brighter at its center than at its edges;

an optical image transferring member located within the endoscope and extending from the proximal end to the distal end of the endoscope;

a video sensor operatively coupled to the distal end of the endoscope for imaging an optical image having differential picture brightness due to uneven illumination;

compensating apparatus operatively coupled to said video sensor comprising a sawtooth wave generator for generating a sawtooth waveform having a predetermined rising slope, a predetermined falling slope and a controlled amplitude;

a parabola wave generator for generating a parabola waveform having a controlled amplitude and orientation; and an adder operatively coupled to said sawtooth wave generator, said parabolic wave generator and a video signal for adding said sawtooth waveform, said parabolic waveform and said video signal to produce a compensating video signal used as an input to a video signal processor adjusting its gain both vertically and horizontally, the video signal being compensated by increasing the gain of the video signal representing that part of the optical image which is less bright than a reference and reducing the gain of the video signal representing that part of the optical image which is brighter than a reference, therein compensating said video signal to represent an image having a substantially uniform brightness; said compensating apparatus adjusting the gain of said video signal processor both vertically and horizontally by increasing the gain of the video signal in response to the sawtooth waveform representing the periphery of the optical image and reducing the gain of the video signal in response to the parabolic waveform representing the center of the optical image, therein compensating said video signal to represent an optical image having a substantially flat brightness.

2. The system of claim 1 further comprising an amplifier for amplifying the compensated video signal; and a sensing device operatively coupled to the amplifier for receiving the compensated video signal and for sensing and removing noise therefrom.

3. The system of claim 1 wherein said light guide is a fiber optic light guide.

* * * * *